(No Model.) 2 Sheets—Sheet 2.

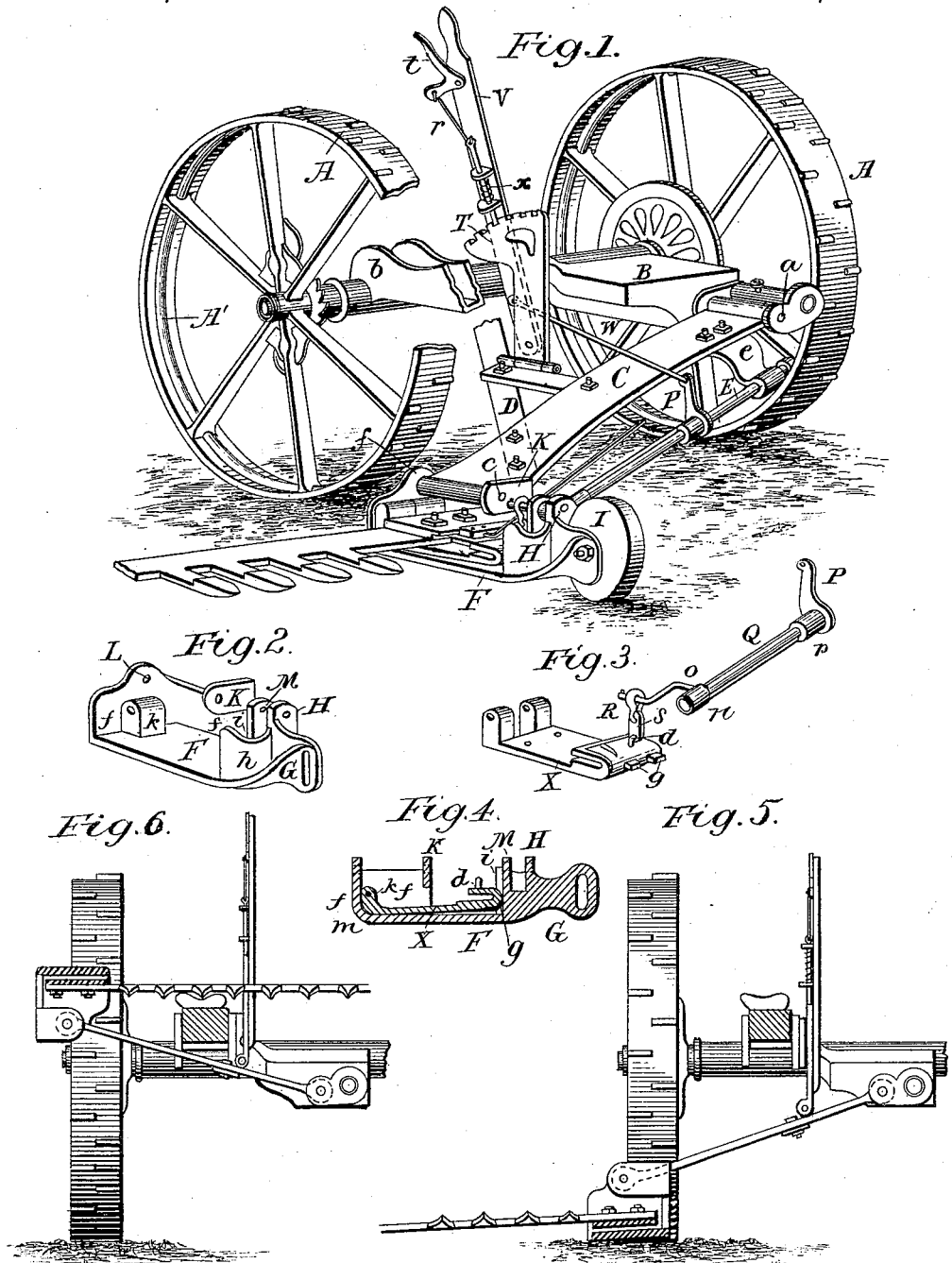

G. M. PATTEN.
HARVESTER AND MOWING MACHINE.

No. 330,729. Patented Nov. 17, 1885.

UNITED STATES PATENT OFFICE.

GEORGE M. PATTEN, OF JERSEY CITY, NEW JERSEY.

HARVESTER AND MOWING-MACHINE.

SPECIFICATION forming part of Letters Patent No. 330,729, dated November 17, 1885.

Application filed July 21, 1881. Serial No. 38,249. (No model.)

*To all whom it may concern:*

Be it known that I, GEORGE M. PATTEN, a citizen of the United States, residing at Jersey City, county of Hudson, State of New Jersey, have invented new and useful Improvements in Harvesters and Mowing-Machines; and I do hereby declare that the following specification, when taken in connection with the drawings which accompany and form part of the same, is a description of my invention sufficient to enable those skilled in the art to which it appertains to practice it.

Figure 7:
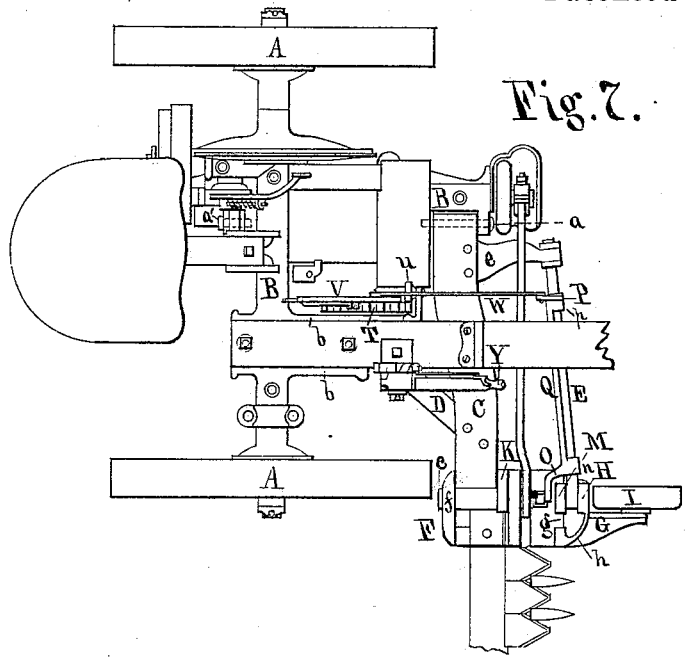
Figure 8:
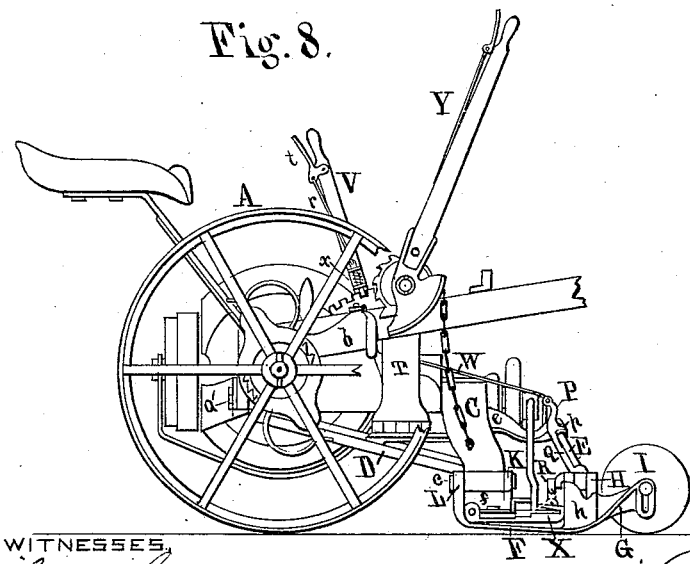

The object of my invention is to provide, in a harvesting-machine, first, a means of attaching thereto the cutting apparatus and a leading-wheel in such a manner that the cutting apparatus may be rocked on an axis in line of its length to throw the points of the guards and cutters up or down without interfering with the raising, lowering, or folding of the cutting apparatus by the ordinary means, and also without interfering with the action of the leading-wheel; secondly, to provide a mechanism for controlling the position of the guards and cutters by means of a lever and hinged standard or sector-rack, with necessary connections so arranged that the said lever and standard always maintain about the same position relatively to the driver's seat. I attain these objects by the following mechanism:

Figure 1 is a perspective view of a portion of a harvester showing the improvements; Fig. 2, a perspective view of the intermediate coupling-piece, with provision made for attaching a lead-wheel thereto; Fig. 3, a perspective view of the finger-bar socket and bell-cranks for operating the same. Fig. 4 is a longitudinal sectional view of the intermediate coupling and the finger-bar socket connected together by the hinge-bolt M. Fig. 5 is a vertical cross-section of a portion of the machine in front of the lever-standard, and in rear of the front brace of the cutter-frame, showing the relative position of the lever-standard and cutter-frame when the cutting apparatus is in about the lowest practical working position. Fig. 6 is a similar view, with the cutting apparatus at the other extreme position, folded horizontally and over the pole. Fig. 7 is a plan view of a machine of the well-known Buckeye type with my improvements added. Fig. 8 is a side elevation of the same.

Similar letters refer to similar parts throughout the several views.

A A are the supporting and driving wheels; B, a portion of the gear-frame, which is rigidly connected with the pole-socket *b*, which is partly cut away in Fig. 1 to show the lever-standard T. The gear-frame B is carried in a plane substantially parallel to the ground by means of a pole bolted to the pole-socket *b*.

In order to give to the cutting apparatus the necessary flexibility, when united with the machine, to follow the surface of the ground closely without being influenced by the position of the gear-frame or pole, a cutter-frame composed of the cross-bar C and the rear brace-bar, D, and front brace-bar, E, with the bracket *e*, all rigidly connected, is provided, having a pivotal or hinged connection to the gear-frame on the bolt *a*, and on another bolt, *a'*, Figs. 7 and 8, in line with the same at the rear end of the brace D, on which it is free to vibrate. The cross-bar C and front brace, E, have formed at their outer ends eyes or portions of a hinge for connection by means of bolts with other parts, to be hereinafter fully described.

The intermediate metal coupling-piece represented in Fig. 2 is constructed to constitute also the inner shoe of the cutting apparatus. It may perhaps be preferably constructed as an arch-piece over a shoe, or its front and rear portions may be connected above, or both above and below, the finger-bar socket, and it may be provided with a means of attaching to it a lead or carrying wheel, or not, as may be desirable.

The intermediate coupling-piece, as shown, consists of a flat shoe, F, the front end of which is curved upward to facilitate its movement over the inequalities of the ground, and to prevent it from pushing along the cut grass. One side of the forward portion is cut away, and against the portion left, and perpendicular to the same, is formed a strong neck or lug, G, the rear end of which joins the ear H, and the front of which has a perpendicular slot, through which a bolt may be passed for adjustably attaching thereto, to assist in the free movement of the cutting apparatus over the ground, the lead-wheel I (shown in Fig. 1, also in Figs. 7 and 8) and the axle on which the same revolves. At the rear end the shoe is also curved upward into a perpendicular rim, $ff$, which extends also along a portion of the inside edge of the shoe for carrying an ear, K, projecting laterally over the flat portion F. This rim, passing under the cross-bar C, is made of proper height to serve also as a gag by striking the cross-bar C, to restrain the action of the hinge of which the bolt $c$ is the pivot in one direction, and thereby prevent the outer end of the cutting apparatus dropping below proper working limit, and also to enable the driver to raise the outer with the inner end of the cutting apparatus by the same means, which, as shown in Figs. 7 and 8, consists of a lever, Y, with a segment-socket eccentrically pivoted to a ratchet-rack on the pole, and provided with a thumb-latch and lock-bolt to engage said ratchet and hold the lever Y in different positions at will. The segment-socket of the lever Y is connected to the cutter-frame by means of a chain of such length that it hangs loosely when the lever Y is thrown forward, (and the lead-wheel I rests on the same plane with the wheels A A,) as in the figures. As the lever is turned backward the eccentric segment draws up the chain, and thus raises the cutter-frame and the parts attached thereto. On the rim $f$ at the rear end of the shoe another ear, L, is raised perpendicularly. Two more perpendicular transverse ears, M H, are provided near the front of the shoe, and all four ears are so aligned and spaced that they will receive between the two rear ones the eye of the cross-bar C, and between the two forward ones the eye of the front brace, E, and, being properly bored, bolts may be passed through each set and the eyes of the inclosed portions of the cutter-frame, forming coincident longitudinal hinges, and thereby fastening the coupling-piece to the cutter-frame. The line of these hinges bears such a relation to the line of the flat portion of the coupling-piece that the hinge being carried horizontally to the ground, the coupling will be raised somewhat at the rear end, and the hinge is at such a distance above the flat portion F as to admit the bar-coupling C in its different positions. The space between the rear rim of the coupling and the ear M is also sufficient to admit between them the finger-bar socket X, Fig. 3. The ear H is provided with a wing, $h$, on each side to prevent grass and dirt from collecting in the parts back of it, and with the ear M, in which, as also in the wing $h$, there are ways $i\ i$ for guiding and bracing the front of the finger-bar socket. The intermediate coupling, Fig. 2, is also provided at its rear end with one or more lugs, $k$, forming a portion of a transverse hinge below the line of the longitudinal hinges, and is tapered somewhat in its width on the outer edge, both forward and back from the rear edge of the wings of the lug M, to prevent its catching grass and dirt. A supplementary metal shoe or finger-bar socket, together with the bell-cranks and connections thereto, is shown in perspective in Fig. 3. The bar-socket is of flat form to fit within the coupling-piece, Fig. 2, as shown in Figs. 1, 4, 7, and 8. It is formed with portions of a hinge at its rear end, to correspond with the portion $k$ of the transverse hinge of the coupling-piece, Fig. 2, and at its front end is provided with one or more extensions, $g$, to fit in the ways $i\ i$ of the coupling-piece, Fig. 2. It is also provided just in front of and in line with the rear hinge with a proper socket for the finger-bar, which is firmly attached to it by suitable bolts, and at the front with a cap and other means for protecting and guiding the movements of the cutter-head. On the front cap is formed an ear, $d$, to which the link $s$ is fastened, so that when the bar-socket is in position within the coupling-piece the space will be directly below the line of the longitudinal hinges of the coupling-piece and cutter-frame. The bell-cranks O and P are provided with sleeves $n\ p$, to pass around the front brace, E, and are connected by the bar Q, of suitable length, so that the sleeve $n$ being close to the front hinge of the finger-bar socket, the other may be about in line with the lever-standard at right angles to the axle of the machine, as shown in Fig. 1. The two cranks O P are rigidly affixed to the connection at an angle to each other suitable for the purpose. The crank O is formed to pass to the rear of the lug M of the coupling-piece, and extend back in line with the longitudinal hinges of the same. This extended part is round, and on it is secured, by a pin passing through it, a coupling, R, which is free to turn on the crank O. This coupling and the ears $d$ of the bar-socket are connected together by a link, S, transversely pivoted to both. The length of this coupling and link is such that, all parts being in position, as in Fig. 1, the crank O and bar-socket will both be horizontal, and the crank P will stand nearly perpendicular, but inclined somewhat toward the lever-standard T. The lever-standard T is formed with a hinged base, which is firmly affixed to the cutter-frame or coupling parts in any convenient position in the rear of the back line of the cutting apparatus, with the axis of the hinge extending in the same direction as the axis on which the frame or coupling vibrates. Its top portion is formed into a rack-sector, and pivoted to the standard T, near the base, is a lever, V, connected by the rod W to the crank P. A locking-bolt, $x$, controlled by a link, $r$, and thumb-lever $t$, serves to lock and hold the lever V, and, by means of the connections the transversely-hinged bar-socket X, in fixed relative positions. The lever-standard T, having its straight front edge fixed in a guide or ways on the gear-frame B or pole-socket $b$, the guide, as shown in Fig. 7 of the drawings, being simply a slight projection on the pole-socket which bears on one side of the standard, while the other side is supported by the roller $u$, mounted on a bracket, it is manifest that when the cutter-frame is raised by the conformation of the ground, or by means of the ordinary lever, Y, Figs. 7 and 8, provided for the purpose, to pass an obstruction or to fold the cutting mechanism for transportation, the lever-standard T, being hinged thereto and guided as described, will rise in a nearly perpendicular position, and all the parts being carried on the cutter-frame their relative positions will not be materially changed, and consequently will not interfere with the movements of the cutter-frame, nor will such movements interfere with the proper operation of the lever and connections.

From the foregoing description it will be seen that, all the parts being properly connected in position, the driver can at will, without stopping his team, by means of the lever V, located conveniently to his hand, change and fix the position of the bar-socket X within proper working limits, imparting to it a rocking motion on its rear hinge, and thereby raising or lowering the points of the cutting apparatus attached to it, as may be desirable, without in any way affecting the position of the intermediate coupling-piece, Fig. 2, or the lead-wheel carried on the same, as shown in Figs. 1, 7, and 8, and without regard to the positions of those parts which relatively to the gear-frame of the machine are varied by the conformation of the ground they and the cutting apparatus are passing over, and which they are free to follow by reason of the hinges at both ends of the cutter-frame. Nor does this movement of the finger-bar socket on its hinge within working limits vary materially the line of the connecting-rod, and all liability of any binding of the same can be prevented by the use of a ball-and-socket or other joint of similar effect on one end instead of on both ends, as is generally rendered necessary by a rocking bar. The pivotal motion of the coupling R on the crank O can by locking the lever V in its position for ordinary use, with the guards and cutters level to the ground, be made coincident with the movement of the intermediate coupling, Fig. 2, on its longitudinal hinge to the cutter-frame, and as there is no gag or limit to the upward action of that hinge the cutting apparatus is free to follow any conformation of the ground which tends to raise its outer end, and may be turned upright and over against the pole, and when the cutter-frame is raised to the bottom of the pole the cutting apparatus can be folded horizontally over the same in front of the levers, as shown in Fig. 6, the pole being shown in cross-section, and the bar may be held by the ordinary means in any intermediate position between the extreme limits described desirable for transportation. This freedom of action of the cutting apparatus is not, however, wholly dependent on the locking of the lever V, as described, for the finger-bar socket X, by its movement on its rear hinge, will during the turning of the cutting apparatus move up or down, and allow the turning of the coupling R on the crank O, even though they were not arranged coincident to the other longitudinal hinges.

Having thus described my invention, what I claim as new, and desire to secure by Letters Patent, is—

1. The combination of the hinged lever-standard or sector-rack with the lever-arm pivoted thereto, substantially as described.

2. The combination of the vibrating cutter-frame with a lever-standard or sector-rack hinged thereto, and a lever-arm pivoted to said lever-standard, substantially as described.

3. The combination of the hinged lever-standard, the lever pivoted thereto, the connecting mechanism, and the finger-bar socket, all arranged and combined as specified.

4. The combination of an intermediate coupling device provided with a lead-wheel, and hinged to the cutter-frame in an axis at about right angles to the main axle of the machine, with a finger-bar socket hinged to the said coupling device by pivots arranged below and at right angles to the axis on which the intermediate coupling device is hinged to the cutter-frame, substantially as described.

5. The intermediate coupling-piece supported by a lead-wheel and provided with two sets of ears or lugs to form portions of longitudinal hinges, by which it is attached to the vibrating cutter-frame, and with another set of ears or lugs to form portions of a transverse hinge, by which the finger-bar socket is attached thereto.

6. The combination of a cutter-frame free to vibrate on hinges located on the main or gear frame, with an intermediate coupling-piece supported by a lead-wheel and longitudinally hinged to the said cutter-frame, said intermediate coupling-piece being provided with lugs or ears which are adapted to form portions of another and transverse hinge, by which the finger-bar socket is attached to said intermediate coupling-piece, substantially as described.

G. M. PATTEN.

Witnesses:
 HARRY EDWARDS,
 J. M. REED.